United States Patent [19]
Seaman et al.

[11] Patent Number: 6,088,296
[45] Date of Patent: Jul. 11, 2000

[54] SOFT-BODIED, TOWABLE, ACTIVE ACOUSTIC MODULE

[75] Inventors: Peter E. Seaman, Niantic; Thomas R. Stottlemyer, Mystic, both of Conn.; Norman Toplosky, Wakefield, R.I.; Anthony A. Ruffa, Hope Valley, R.I.; Frederick J. Frodyma, Tiverton, R.I.

[73] Assignee: The United States of America as represented by the Secretary of the Navy, Washington, D.C.

[21] Appl. No.: 09/317,088

[22] Filed: May 21, 1999

[51] Int. Cl.⁷ ........................................................ G01V 1/38
[52] U.S. Cl. ................................................................ 367/106
[58] Field of Search ............................ 367/106, 17, 130; 114/245, 253, 254

[56] References Cited

U.S. PATENT DOCUMENTS

| | | | |
|---|---|---|---|
| 3,921,562 | 11/1975 | Kelly | 114/253 |
| 5,856,954 | 1/1999 | Grall | 367/106 |
| 5,909,408 | 6/1999 | Warnan et al. | 367/106 |

*Primary Examiner*—Ian J. Lobo
*Attorney, Agent, or Firm*—Michael J. McGowan; Robert W. Gauthier; Prithvi C. Lall

[57] ABSTRACT

A soft-bodied, towable, active acoustic module includes a specially formed suspension fixture and a flexible faired body enclosing an active acoustic array. The suspension fixture is a Y-shaped tube having a single forward end and two trailing ends, one for attachment of a trailing tow cable and the other for attachment of the flexible, faired body. The flexible, faired body is an elongated hydrofoil having sections which allow lateral bending. The combination of the suspension feature and lateral bending feature allows the module to be deployed and recovered through shipboard undersurface deployment tubes. A weight attached to the faired body near the lower rear end balances the body to maintain a substantially vertical position during towing. Flow steps on the lower portion of the faired body reduce lateral oscillations.

16 Claims, 5 Drawing Sheets

SOFT-BODIED, TOWABLE, ACTIVE ACOUSTIC MODULE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention relates to the field of sonar sensors and in particular to towed, active sonar arrays.

(2) Description of the Prior Art

Although passive (receiving) towable sonar arrays have become refined technology, active (transmitting) arrays, because of the requirement to position the array in an upright, vertical position, have presented certain drawbacks. Typical conventional active systems are mounted in hard, typically large, rigid towed bodies, for example, the current AN/SQS-35 tow body. The tow body is required to maintain the active array in a proper vertical orientation in order to provide the required acoustic pattern. Conventional towed active sonar systems are large, cumbersome, and require expensive handling systems that use a substantial amount of space aboard a surface combatant. Depending on the frequency of the transducers, the hard, towed bodies are quite large and difficult to handle, frequently weighing up to 4000 pounds or more. Additionally, the handling equipment needed to deploy and recover such a tow body requires considerable deck space on the aft end of the ship and this equipment presents a large radar target. The launch doors, chutes, and associated hardware also increase the radar signature of the ship. These types of handling systems impose limitations on the maneuverability of the tow vessel, prevent the covert deployment of the active array, and are unwieldly and dangerous for deployments or recoveries during high sea states. A means is needed whereby an active transducer array can be deployed from a ship in a manner similar to the deployment of passive transducer arrays, such as paying out through a hull-mounted port. The active transducer array must, nevertheless, tow in a substantially vertical position after deployment.

SUMMARY OF THE INVENTION

Accordingly, it is an object of the invention to provide an active sonar transducer array, which can be deployed and recovered using conventional cable-handling systems.

It is another object of the invention to provide an active sonar transducer array, which can be deployed and recovered through in-hull ports.

It is yet another object of the invention to provide an active sonar transducer array having a towable soft-body.

It is still a further object of the invention to provide an active sonar transducer array having a means of maintaining the active array in a substantially vertical orientation throughout the range of towing speeds of the towing ship.

The invention is an active sonar system mounted within a soft-body having active transducers held in a faired tube using cabling and elastomeric spacers. The combination of the shape of the faired tube, the tow harness attachment, and the weighting of the faired tube provide the vertical orientation of the array. The requirement to maintain a substantially vertical orientation over a speed range while allowing the array to be drawn into the launch/deployment tube results in a complex interaction of the above factors. The invention meets these requirements by providing a faired soft enclosure with an offset weighed bottom end.

BRIEF DESCRIPTION OF THE DRAWINGS

The foregoing objects and other advantages of the present invention will be more fully understood from the following detailed description and reference to the appended drawings wherein corresponding reference characters indicate corresponding parts through out the several views of the drawings and wherein.

DESCRIPTION OF THE PREFERRED EMBODIMENT

Figure 1:
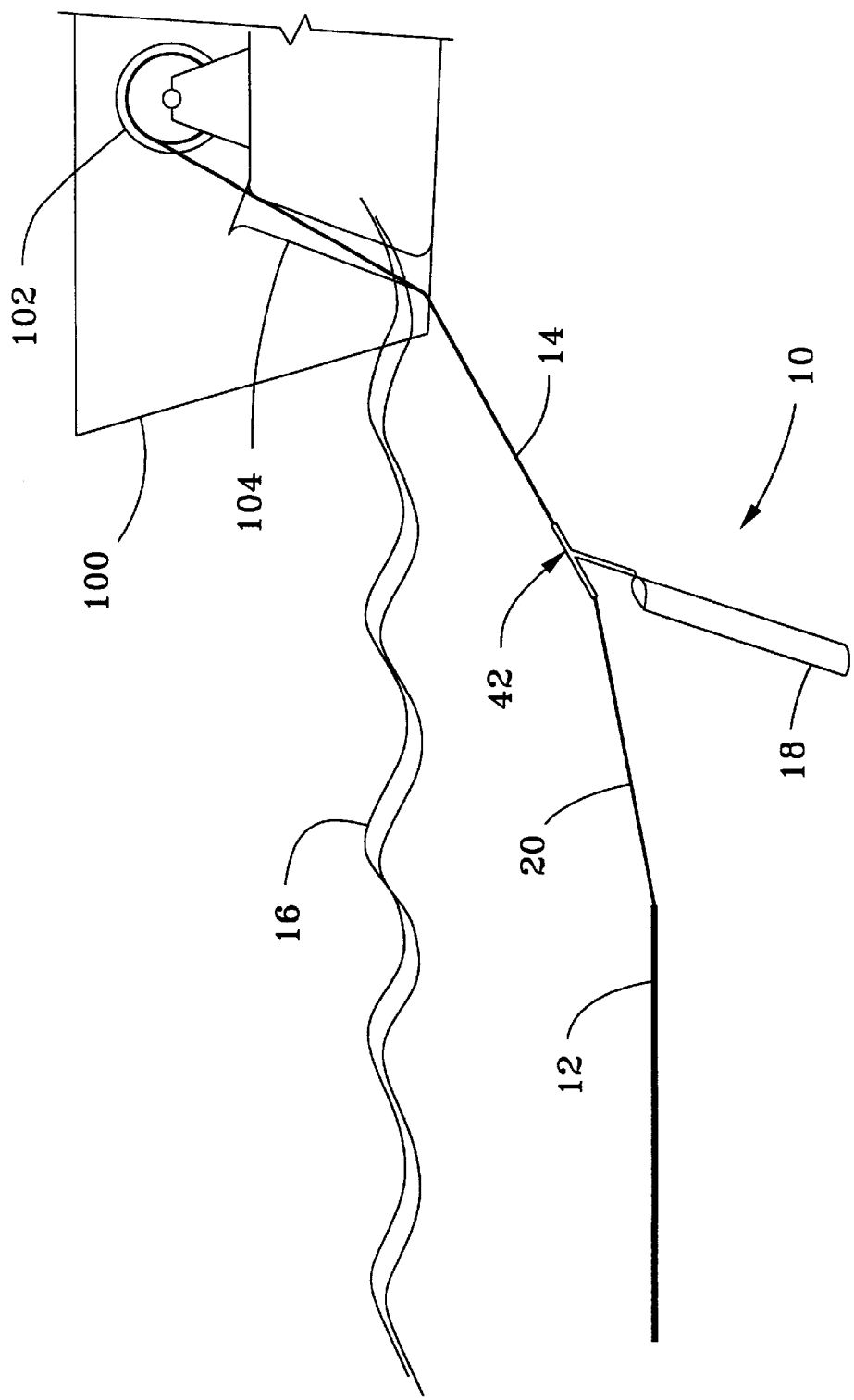
FIG. 1 is a schematic side view showing the deployment of the soft body, active acoustic module as attached to a deployed passive receiver array.

Referring now to FIG. 1, the towed active acoustic module, designate generally by the reference numeral 10, is shown deployed with a passive acoustic array 12. Because of the flexible structure and the relatively small physical size (compared to current hardbody designs), the active acoustic module 10 is deployable from ship 100 using the available recovery system 102. The recovery system 102 is a below-decks system using an underwater deployment tube 104 which deploys the sonar arrays beneath the sea surface 16. The active acoustic module 10 is shown deployed with a strengthened towline 14 using a steel tow cable section. The active acoustic module comprises the suspension fixture soft body enclosure 18. The soft body enclosure is a faired body, preferably forming a hydrofoil with a span extending downward. A typical passive receiver array 12 is depicted using a Kevlar tow cable section, towline 20. The entire array system, both the passive and active modules, can be deployed using a single deployment/recovery system. Additionally, the entire array can be recovered through the underwater deployment tube 104, thereby eliminating the current deck side systems and reducing the radar signature of the ship.

Figure 2:
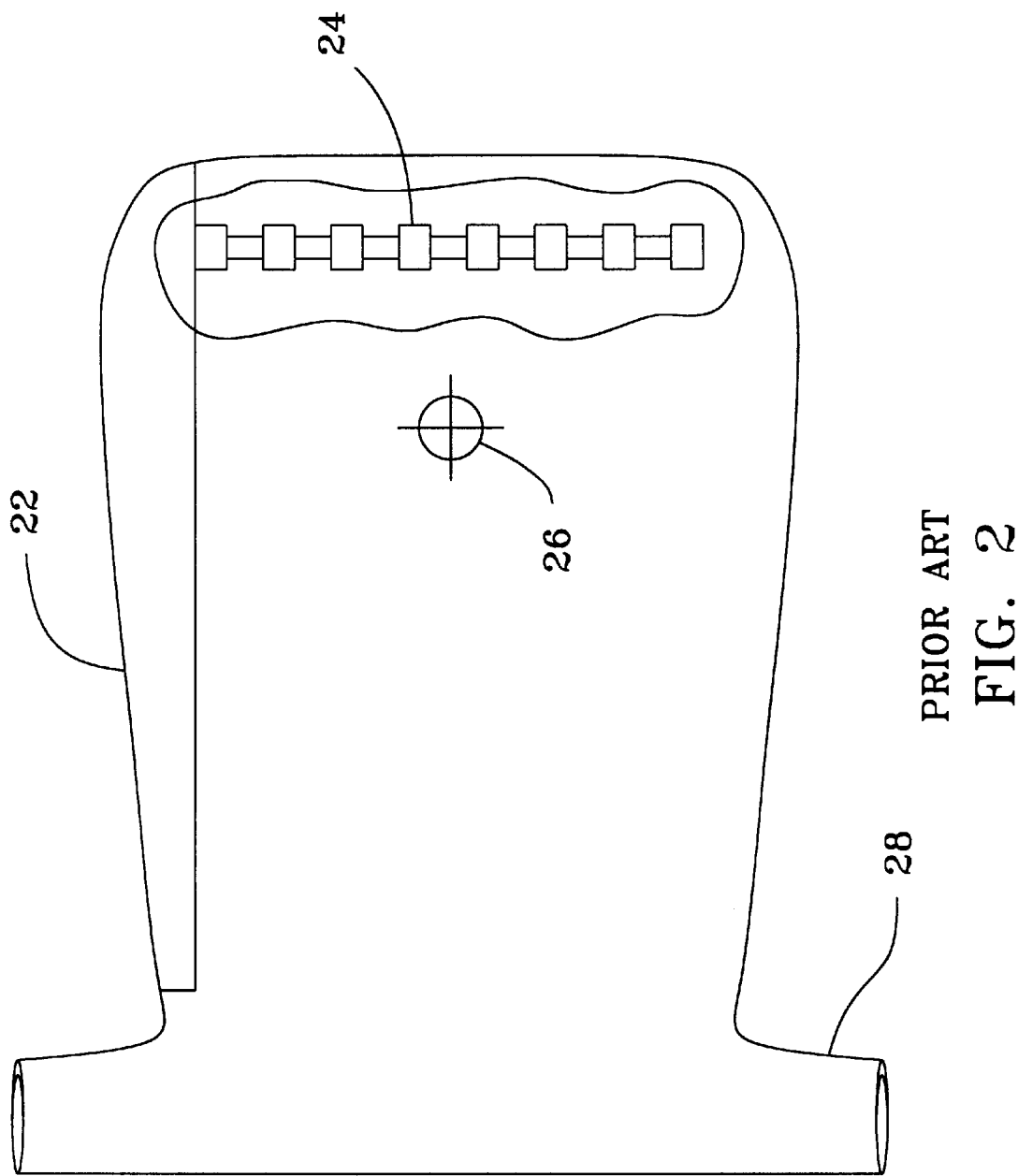
FIG. 2 is a side view of a prior art active acoustic module showing a conventional hard-body design.

By comparison, current prior art implementation of active sonar modules requires hard tow-bodies as depicted in FIG. 2. The hard tow body 22 is large and cumbersome because the vertical dimension must be large enough to allow the active acoustic array 24 to fit within the tow body. The center-of-gravity 26 of the hard tow body is located longitudinal forward (compared to the center of the side and bottom surface areas) so as to allow a balance of the forward-mounted tow connection and the water forces on the aft fins 28. This type of large tow body creates significant hydrodynamic effects including wake, drag and increased acoustic signature.

Figure 3:
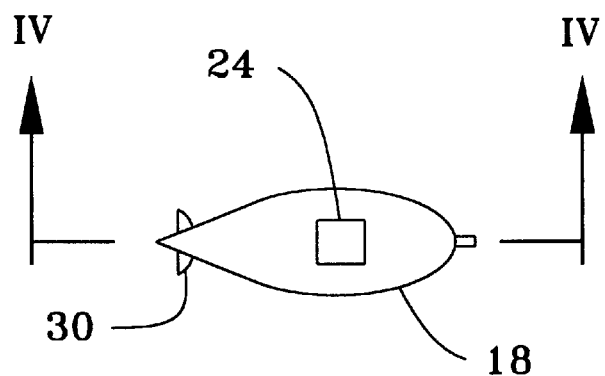
FIG. 3 is a top view of the soft body module showing the faired shape of the soft body.
Figure 4:
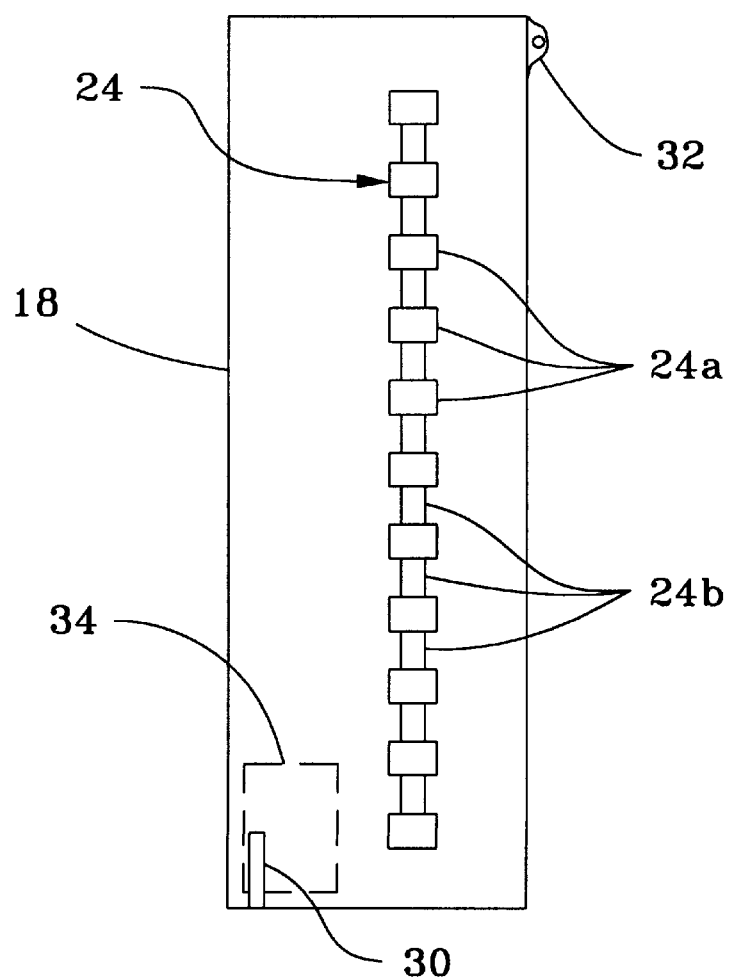
FIG. 4 is a cross-sectional side view of the soft body module showing the major components of the invention.

In contrast, the structure of the present invention is only slightly larger than the acoustic array as shown in FIGS. 3 and 4. FIG. 3 is a top view of hydrofoil faired body 18 which encloses the active acoustic array 24. Small flow control devices or steps 30 are located on the lower surface of faired body, or hydrofoil 18. This feature may be seen also in the cross-sectional view of FIG. 4 (taken along the line IV—IV of FIG. 3). The flow control step 30 is located near the trailing edge of the hydrofoil 18. Because the tow point 32 is located on the forward top edge of the hydrofoil 18, the hydrofoil 18 is laterally stabilized by the tow cable 14 (FIG. 1) over the normal operating speed range. The lower end of the hydrofoil 18, however, may develop lateral oscillations at certain speeds due to small changes in yaw angle. The location of the weight 34 aids in dampening any oscillations. Additionally, the flow control steps 30 provide a small eddy when turned into the mainstream flow. This action provides a correcting torque on the hydrofoil 18 further dampening any tendency toward lateral oscillation. The active acoustic array 24 is shown to depict the relatively small size of the hydrofoil faired-body 18 compared to the overall size of the active acoustic array 24. This compact and faired body produces minimal hydrodynamic effects behind a towing ship. The acoustic array 24 is made up of a plurality of transducers 24a which are joined together by elastomeric material and cabling 24b.

Figure 5:
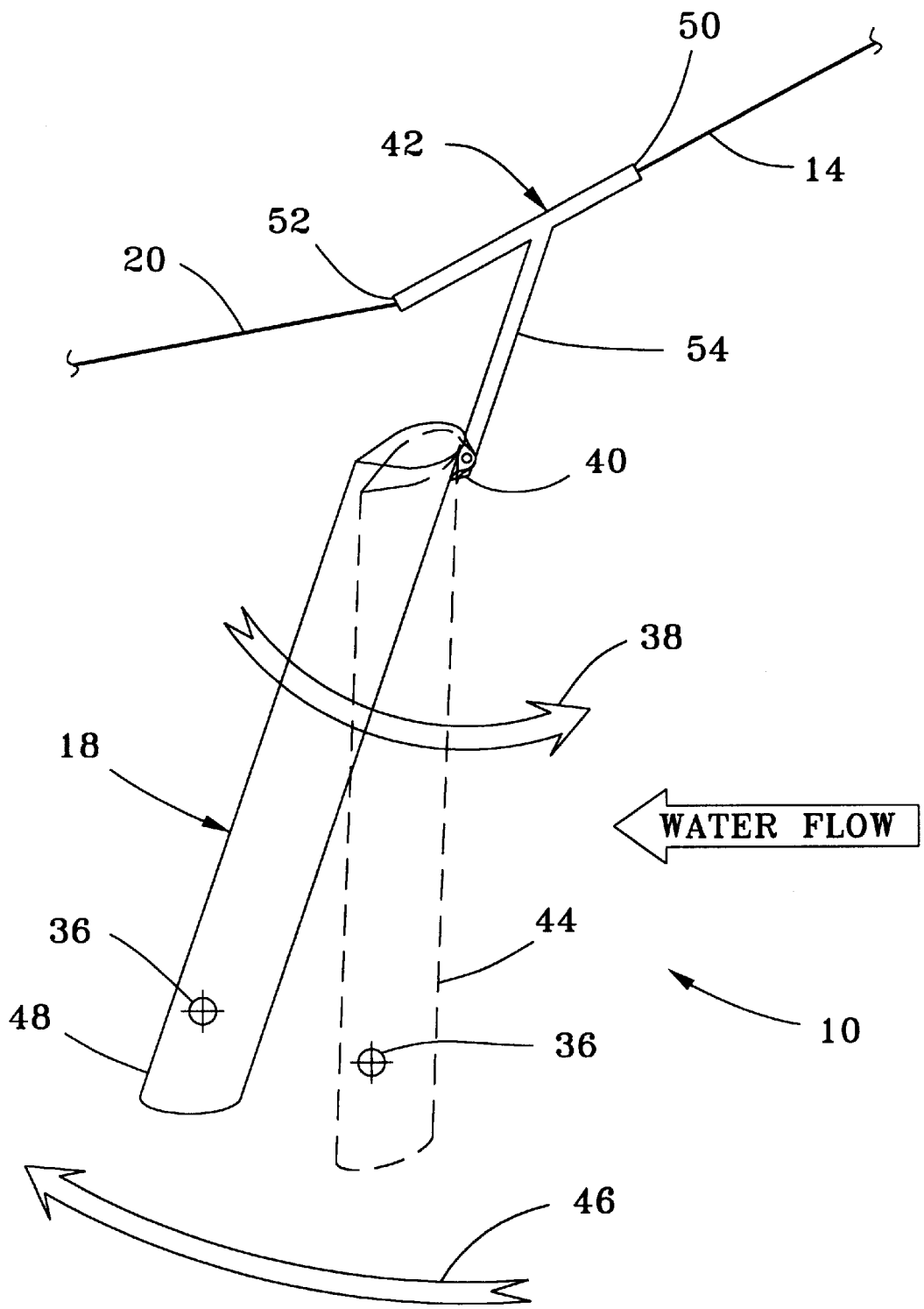
FIG. 5 is a schematic showing the torque forces on the soft body caused by the offset center-of-gravity and opposing torque forces caused by water flow.

In addition to stability, the faired body 18 must maintain the substantially vertical orientation of the active acoustic array 24. This feature may be seen in FIG. 5 wherein the active acoustic module 10 is shown suspended from the tow cables 14 and 20 during typical towing conditions. The offset balancing weight 34 (shown in FIG. 4) attached in a lower and rearward location on the faired body 18, and therefore the offset location of the center-of-gravity 36, results in a counter-clockwise torque 38 caused by the center-of-gravity 36 aligning itself vertically under the suspension point 40 (corresponding with tow point 32 in FIG. 4) on suspension fixture 42. The resulting position of the hydrofoil with no motion (and no drag) through the water is shown by the dash-lined position 44. As the tow speed is increased, the hydrodynamic drag on the foil provides a rearward clockwise torque 46 thereby moving the hydrofoil 18 to position 48 where the torques of the weight offset and the water drag are balanced. This action maintains the active array within a substantially vertical position over the operational speed of the tow vessel, that is, within 30° of a vertical alignment. The tow fixture 42 causes a standoff of the hydrofoil 18 away from the tow cables 14 and 20 thereby allowing unrestricted pivoting at the suspension point 40. The suspension fixture 42 in the preferred embodiment is a rigid stainless steel fixture formed with a connector tube with a first or forward end 50 for connecting to tow cable 14, a second or rearward end 52 for connecting to trailing tow cable 20 and a stand-off arm 54. Suspension fixture 42 also serves to protect the conductors (not shown) which transmit power to the transducers 24a in faired body 18. Pivoting about suspension point 40 is necessary in order to recover the active array 10 using an underwater deployment tube.

Figure 6:
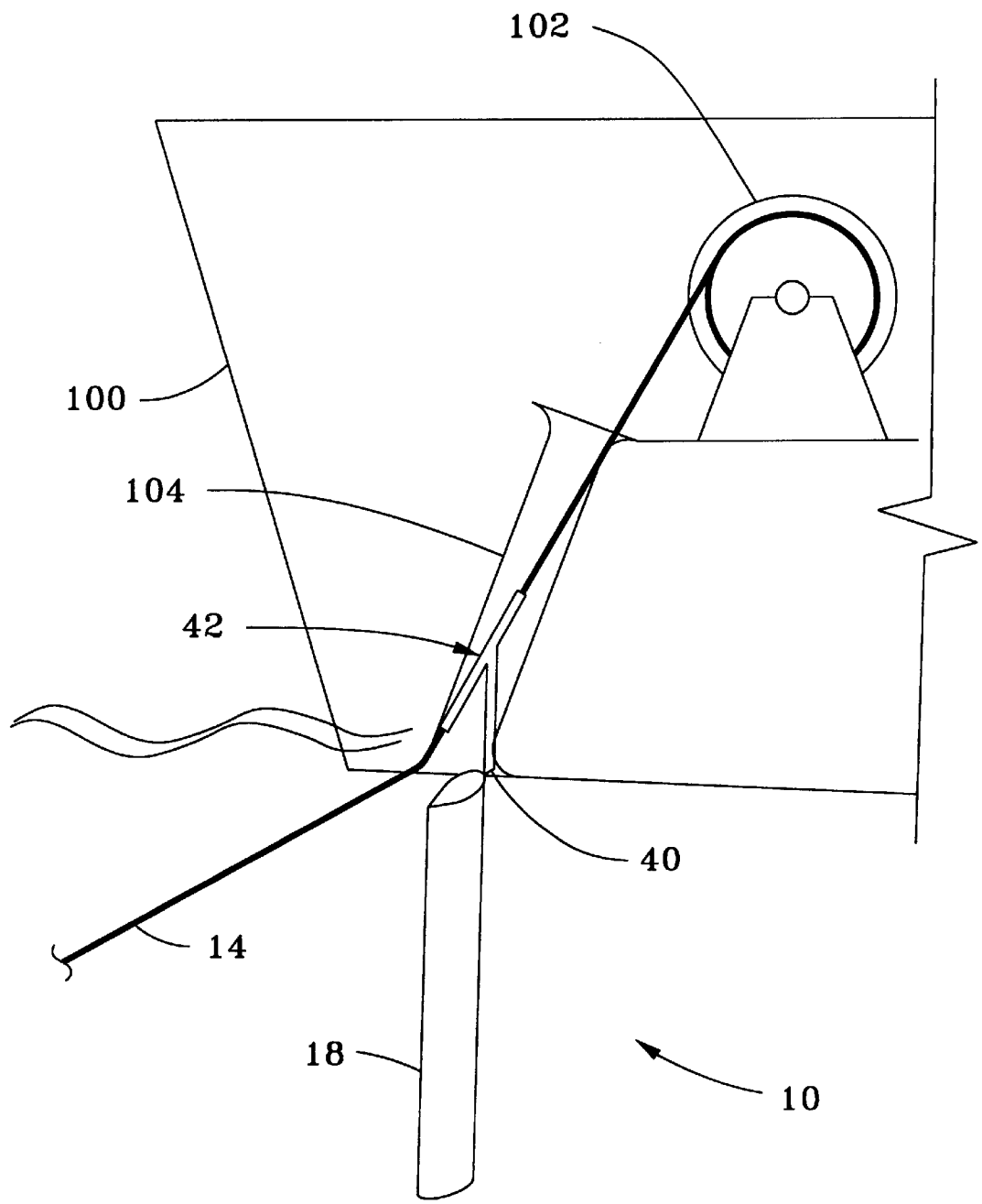
FIG. 6 is a schematic side view showing the functioning of the harness during recovery of the soft body module.

Referring to FIG. 6, the active acoustic module 10 is shown during recovery through a deployment tube 104 of a ship 100. As the suspension fixture 42 enters the tube 104, suspension fixture 42 pivots up into the tube 104. Because the hydrofoil 18 is free to pivot around suspension point 40, the hydrofoil 18 pivots back under the suspension fixture 42, the fixture 42 holding the foil 18 away from the aft side of the deployment tube 104 and preventing any hang up between the foil 18 and the edge of the tube 104. Finally, the segmented section and flexible construction of the hydrofoil 18 allow the foil 18 to turn sideways on the recovery drum 102 and wrap around the drum 102.

The features and advantages of the invention are numerous. The soft body underwater deployment characteristics eliminate the need for separate deck-mounted deployment and recovery gear. Further, the suspension fixture allows deployment and recovery of the active acoustic module using the existing passive sonar deployment and recovery systems. Additionally, the active acoustic module may be attached to and become an integral part of an existing passive sonar array using a single, segmented towline. Further, the hydrodynamic penalties associated with the prior art hardbody systems are reduced, that is wake, drag and acoustic noise.

Although the system has been described in specific embodiments, it is understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A soft-bodied, towable, active acoustic module comprising:
   a suspension fixture for attachment to a tow cable; the suspension fixture having
   a stand-off arm
   a flexible body portion having segmented sections which allow lateral bending of the body portion, such body portion being pivotably attached to a free end of the stand-off arm, the stand-off arm maintaining a separation between the body portion and the tow cable for unrestricted pivoting of the body portion about the pivotable attachment; and
   an active acoustic array located within said body portion and extending along a span of said body portion, said pivotable attachment allowing said body portion with said active acoustic array to be towed in a substantially vertical position.

2. A soft-bodied, towable, active, acoustic module as in claim 1 wherein said body portion further comprises a means for positioning said body portion in said substantially vertical position.

3. A soft-bodied, towable, active acoustic module as in claim 1 wherein said suspension fixture fabricated of stainless steel.

4. A soft-bodied, towable, active acoustic module as in claim 2 wherein said means for positioning comprises an offset balancing weight attached in a lower and rearward location in said body portion.

5. A soft-bodied, towable, active acoustic module as in claim 2 wherein said means for positioning comprises a flow control device to provide lateral stability.

6. A soft-bodied, towable, active acoustic module as in claim 5 wherein said flow control device is a pair of flow steps located on a lower surface of said body portion.

7. A soft-bodied, towable, active acoustic module as in claim 1 wherein said active acoustic array comprises a plurality of acoustic transducers connected together with flexible connectors.

8. A soft-bodied, towable, active acoustic module as in claim 1 wherein said body portion comprises a hydrofoil, the hydrofoil reducing drag to further maintain the body portion in the substantially vertical position.

9. A soft-bodied, towable, active acoustic module comprising:
   means for attaching the active acoustic module to a tow cable, said means having both a stand-off from the tow cable and a pivotable attachment at the stand-off;

a soft enclosure pivotably attached to said pivotable attachment, the stand-off maintaining a separation between the soft enclosure and the tow cable;

an active acoustic array located within said soft enclosure;

means for maintaining an orientation of said active acoustic array within 30° of vertical, said means located within said soft enclosure; and means for laterally stabilizing said soft enclosure, said means attached to said soft enclosure.

10. A soft-bodied, towable, active acoustic module as in claim 9 wherein said means for attaching further comprises a rigid suspension fixture having a connector tube with a first end for attachment to a first towline portion of said tow cable and a second end for attachment to a second trailing towline portion of said tow cable, said stand-off attached by a first end to said connector tube, said pivotable attachment being at a second free end of said stand-off.

11. A soft-bodied, towable, active acoustic module as in claim 10 wherein said rigid suspension fixture is fabricated of stainless steel.

12. A soft-bodied, towable, active acoustic module as in claim 9 wherein said soft enclosure comprises a faired body having segmented sections formed to provide lateral bending.

13. A soft-bodied, towable, active acoustic module as in claim 12 wherein said faired body is a hydrofoil having a span to form an extended fin.

14. A soft-bodied, towable, active acoustic module as in claim 9 wherein said active acoustic array comprises a plurality of acoustic transducers connected together with flexible connectors.

15. A soft-bodied, towable, active acoustic module as in claim 9 wherein said means for maintaining substantially vertical orientation comprises an offset weight located in a lower and rearward portion of said soft enclosure.

16. A soft-bodied, towable, active acoustic module comprising:

a suspension fixture for attachment to a tow cable, such fixture having a stand-off arm;

a hydrofoil having a span to form an extended fin and having segmented sections which allow lateral bending, such hydrofoil being pivotably attached to the stand-off arm of said suspension fixture;

an active acoustic array located within said hydrofoil and extending along the span of said fin;

a balancing weight attached in a lower and rearward location is said hydrofoil, said balancing weight maintaining said active acoustic array in a substantially vertical position; and a pair of flow control steps attached to a lower surface of said hydrofoil, said flow control steps providing lateral stability to the hydrofoil.

* * * * *